Figure 1:
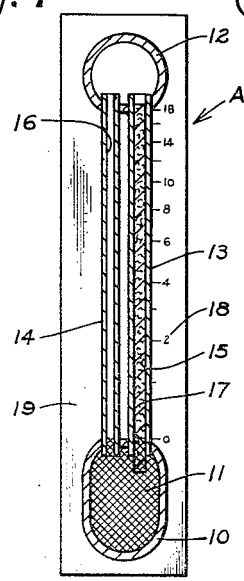

March 29, 1966  K. D. JOHNSON  3,242,733
INDICATOR DEVICE
Filed July 2, 1963

INVENTOR.
Kenneth D. Johnson
BY
Martha L. Ross
AGENT

United States Patent Office 3,242,733
Patented Mar. 29, 1966

3,242,733
INDICATOR DEVICE
Kenneth D. Johnson, Vienna, Va., assignor to Atlantic Research Corporation, Fairfax County, Va., a corporation of Virginia
Filed July 2, 1963, Ser. No. 292,308
22 Claims. (Cl. 73—344)

This invention relates to a device that indicates either solely the elapsed time to which it has been exposed above a predetermined base temperature or an integrated value of both the elapsed time and extent or degree of temperature above the base temperature. More particularly, it relates to a device which accurately and reliably indicates the total time of exposure of the device and material stored with it to temperatures in excess of a desired level or integrates the time and extent of temperature in excess of a desired level to which the device and material have been exposed.

Temperature and time-at-temperature indicating devices of various types are known to the prior art. Some contain a composition which changes color when the device is exposed to a temperature above a desired level. However, such indicators do not measure the time of exposure. Other indicating devices contain a fusible material which melts and flows through a porous material to a visible portion when it is exposed to temperatures above a desired level. In some cases, an attempt has been made to use such devices to indicate the time of exposure. However, these devices are undesirably affected by such factors as mechanical and pneumatic pressure build-up within the device, lack of controlled porosity of the porous material, etc. Consequently, at best, they give only a rough approximation of time of exposure. Another type of indicator employs a chemical composition which liberates an efflux which causes a progressively spreading color change in a second material. Although these chemical indicators are considerably more accurate than the aforementioned type, they suffer the disadvantage that once the reaction begins, either from the time the device is fabricated or from the time it is exposed to temperatures above a predetermined level, it cannot be stopped regardless of whether the subsequent exposure temperatures fall below the predetermined level or not.

It is an object of this invention to provide an improved device that will accurately and reliably indicate the elapsed time during which it has been exposed to temperatures exceeding a desired and predetermined level.

Another object is to provide an indicator device which accurately and reliably sums the periods of time during which the device is exposed to temperatures above a desired level.

A further object is to provide a device which shows a visual indication of the total elapsed time during which the environmental temperature has exceeded a preselected level.

Still another object is to provide a device which accurately and reliably indicates the time and temperature history to which the device has been exposed.

A further object is to provide a device which accurately and reliably integrates the elapsed time and extent of temperature above a preselected temperature to which the device has been exposed.

Other objects, advantages and features of this invention will become apparent from the following detailed description and accompanying drawings.

Figure 2:
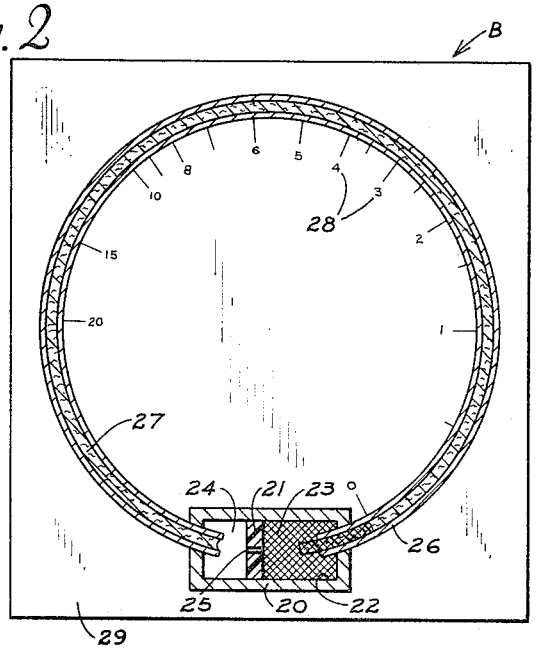
Figure 3:
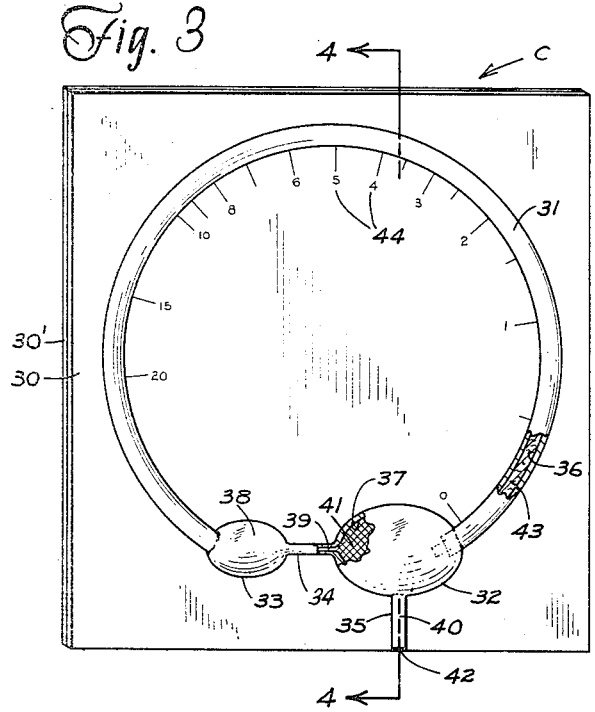
Figure 4:
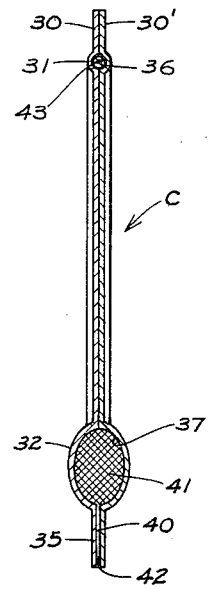

In the drawings:
FIGURE 1 is a vertical sectional view of one embodiment of this invention.
FIGURE 2 is a vertical sectional view of a second embodiment of this invention.
FIGURE 3 is an elevational view of a third embodiment of this invention.
FIGURE 4 is a section taken on line 4—4 of FIGURE 3.

In accordance with my invention, I have developed a device characterized by its ability to accurately and reliably either integrate solely the total elapsed time above a desired and predetermined temperature or both the elapsed time and degree of ambient temperature above a preselected level to which is has been exposed.

In general, my indicating device includes a fluid-tight sealed unit comprising a reservoir of a carefully selected fusible material whose melting characteristics can be closely controlled over a wide range to melt sharply at a desired and predetermined temperature; an impermeable hollow passageway containing a wick of closely controlled porosity through which the fusible material, when melted, migrates by capillary action; and a passage extending from the end of the wick distal of the reservoir back to the reservoir. The fusible material can be tailored so that each successive period of exposure to a temperature above its melting point results in a further advance of the melt in the wick. Thus the device sums or integrates these periods, the cumulative total of which can be translated into total elapsed time by visual inspection of a precalibrated time scale adjacent to the wick. The fusible material can also be regulated to accelerate through the wick at a rate which is a function of the extent or degree of increase in ambient temperature above its melting point. Since the fusible material will not recede in the wick the time-temperature experience of the device is readily available by comparison of the meniscus of the fusible material with an adjacent precalibrated scale.

I have discovered that the aforementioned features, which will be more fully described hereinafter, minimize or permit close control of the forces which adversely influence the accuracy and precision of the migration of the melted material in the porous wick. The provision of a passage from the distal end of the wick to the reservoir places both ends of the migrating column of fusible material under the same system pressure, thus eliminating any substantial pressure differential. The careful selection of a fusible material whose viscosity and surface tension can be accurately controlled over a wide range and the employment of a wick in which the size and shape of its interstices are accurately predetermined results in an accurate and reliable control of the rate of migration of the melted fusible material through the porous wick. These features permit a wide range of integrated time-temperature and time-above-temperature responses which have an excellent degree of reproducibility and which can be accurately correlated with an accompanying precalibrated scale relating the distance of migration of the fusible material with either both the elapsed time and extent of over-temperature or the elapsed time above a predetermined temperature, respectively.

Adverting now in detail to the drawings with particular reference to FIGURE 1, an illustrative embodiment of my indicating device is designated generally by reference numeral A. The device includes a base portion or reservoir 10 containing a fusible material 11 such as microcrystalline wax and a head portion 12. Connecting these two portions in an air-tight relationship are two elongated tubular members or stems 13 and 14 having channels 15 and 16, respectively. A wick 17 is located within channel 15 and extends into fusible material 11. Channel 16 serves as an air passage from head portion 12 back to reservoir 11. A time scale 18 imprinted on backing paper 19 lies adjacent to stem 13.

In operation, the indicating device A is placed in an environment as, for example, one in which photographic supplies are stored, the temperature of which is desirably maintained at or below a particular level. The fusible material 11 is preselected to melt sharply and quickly just above the desired temperature level. The melted material then migrates by capillary action in the wick 17 as long as the temperature remains above the desired level. If it drops below this level the fusible material solidifies and no longer can migrate in the wick. This alternate melting and solidifying can be repeated as many times as the device is exposed to a temperature over the desired level. The total distance of the migration of the fusible material in the wick can then be read on the adjacent scale 18, precalibrated with respect to time, to translate the distance traveled into the total time the environmental temperature has exceeded the desired limit.

As aforementioned, the fusible material 11 can also be preselected to migrate through the wick at an increasingly fast rate as long as the ambient temperature is rising above a desired level. If the temperature subsequently falls the fusible material does not recede in the wick but rather remains constant at its farthest point of migration. Thus the time-temperature history is always readily available by visual inspection of an adjacent precalibrated scale 18.

The provision of a passage such as channel 16 permits the total gas space within the sealed system to remain substantially constant. As the volume of gas space within the wick is decreased by the migration of the melted fusible material, it is increased by approximately the same volume within the reservoir. This maintains both ends of the migrating material under substantially the same system pressure thus preventing the build up of any pneumatic pressure throughout the sealed system.

The fusible material 11 can be selected from a variety of substances such as waxes, e.g., microcrystalline waxes; fatty acids, e.g., stearic acid, palmitic acid; ethers, e.g., diphenyl ether, and the like. These compounds contribute considerably to the accuracy and reproducibility of my indicating device. As aforementioned, the melting characteristics of each can be controlled over a wide temperature range. Each has a low latent heat of fusion permitting quick melting and has a low volume increase on melting thus preventing local pressure in the reservoir before the fusible material is melted completely. The reproducibility of the indices of thermal coefficients of viscosity and surface tension of the fusible materials can be closely controlled with the use of modifying agents, thus permitting accurate prescheduling of the variation of their viscosity and surface tension with changes in temperature. Obviously, the choice of any single fusible material is determined by the particular conditions of each individual use such as the desired melting point, etc. For example, the microcrystalline waxes can be employed in many cases since they are available over a wide range of melting points with little change in the other aforementioned factors which determine their rate of migration in a wick.

As aforementioned, the fusible compounds generally contain other additives or modifiers which permit accurate control and reproducibility over a wide range of parameters such as viscosity and surface tension. These are well known to the prior art and include, for example, polyisobutylene, lauric acid, methyl palmitate, and sorbitan trioleate. In addition, if the fusible material is not clearly visible, a small amount of a dye, which is readily dissolved in the melted fusible material, can be used to improve the ease of detection of the end of the migrating column. Dyes of different colors can be employed to designate fusible materials having differing melting points to minimize likelihood of confusion. These additives can be milled homogeneously into the solid fusible material or dissolved in the melted fusible material which is then resolidified.

The wick 17 is constructed of a material, e.g., paper, compacted powder such as diatomaceous earth and talc, having a sufficiently fine porosity to form capillaries through which the fusible material will flow when it melts. Preferably the wick is constructed of individual strands of natural or synthetic fibers formed into a single bundle. Such bundles have a uniform porosity which can be accurately controlled over a wide range. An even closer control of the porosity can be obtained by twisting or braiding the individual strands into a cord of fibers. A translucent or transparent plastic sheath which forms stem 13 is then extruded about the cord to prevent undesirable gravity flow of the fusible material in the area between the stem and the wick. The degree of twist and compression of the plastic sheath upon the wicking material can be varied to permit accurate control of the porosity that is, the size and shape of the interstices, over a wide range.

The fibers used to construct the wick can be any that are rapidly and completely wetted by the particular fusible material. Fibers such as nylon which are formed by spinning from a melt and consist of monofilaments of regular and constant cross-sectional area are preferred to those such as viscose rayon, which have irregular cross-sectional areas. The regular monofilaments can be twisted to give smaller and more uniform intersticial spaces thus permitting increased control of porosity. Preferably the indices of refraction of the fibers and the fusible material are similar. The optical homogeneity of the two increases the depth of the layer of the migrating liquid visible to the observer.

The sheathing around the porous wick can be any well known transparent material such as plastics, e.g., polypropylene, polytetrafluoroethylene, and the like; glass, etc., which is inert with respect to the fusible material. It must also be hard enough to withstand external shocks which deform it and result in increased compression and an undesirable irregular variance of the porosity of the wick.

To reiterate, the accurate control over a wide range of the aforementioned parameters, that is, the size and shape of the interstices of the porous wick and the viscosity and surface tension of the melted material, etc., permits a like control of the rate of migration of the liquid which is determined by these parameters. Since the interfacial tension between a solid and a liquid migrating through it is the force which determines the migration rate of the liquids, the highly desirable feature of tailoring the indicating device to a wide variety of migration rates is obtained.

The time scale 18 is calibrated empirically for each different combination of fusible material 11 and wick 17 which is used with the indicating device. Thus the device is exposed to temperatures above the melting point of the fusible material and the migration of the melted material is timed and correlated with the scale adjacent to the wick. Any indicator device constructed of the same materials and in the same manner will give the same response as the one already calibrated and, therefore, the time it takes for the migration of the melted material can be designated on the scale 18. The time scale is non-uniform and resembles the logarithmic scale in that it is open at the lower end of the range and compressed at the larger time units. This is due to the increased frictional forces built up in the migrating column of fusible material as its length increases.

My device can be constructed using any conventional method. The fusible material 11 can be melted and the stem 13 containing the wick 17 inserted into the reservoir 10 until the melted material in the wick is brought to the zero marking on the adjacent scale. The fusible material is then resolidified. The juncture of the stem 13 and the reservoir 10 is made fluid-tight as by using a pressure fit or sealing with adhesives, etc. The top portion 12 and second stem 14 are then also fitted into their proper position as by a pressure fit or use of adhesives.

Turning now to FIGURE 2 of the drawings, another illustrative embodiment of my indicator device is generally designated by reference numeral B. It includes a base member 20 divided by a plug 21 into a reservoir 22 containing fusible material 23 and any desired additives such as dyes, etc., and a head portion 24. Plug 21 contains a small aperture 25 extending from the reservoir 22 to the head portion 24. The plug is constructed of a material such as polytetrafluoroethylene which is not wetted by the melted fusible material 23. This prevents the melted material from flowing into the aperture while providing a communication from the reservoir to the gas space within the head portion 24, through which substantial pressure equilibrium of the system can be maintained. A tubular member or circular stem 26 extends from the reservoir to the head space. Located throughout the length of stem 26 is a porous wick 27 which extends into the fusible material 23 in the reservoir 22. A time scale 28 is provided adjacent to stem 26. It can be printed on backing material 29 or directly on the stem.

In FIGURES 3 and 4 of the drawings, in which like numerals indicate like parts, a third embodiment of my device is designated generally by reference numeral C. It comprises two mating sheets 30 and 30' of hard transparent material secured together as by adhesive in a fluid-tight relationship. Since each sheet is an exact mirror image of the other, the following detailed description will include only sheet 30. Sheet 30 contains a circular groove 31 having a first enlarged portion 32, a second enlarged portion 33 and a constricted portion 34, and a mating access groove 35. When sheets 30 and 30' are secured together the mating portions define respectively, a circular hollow passageway 36, a reservoir 37, a head portion 38, a small perforation 39 and a channel 40. The reservoir 37 is filled with a fusible material 41 through channel 40 which is then sealed with a plug 42. The sheets 30 and 30' are a material such as polytetrafluoroethylene which are not wetted by the fusible material. This prevents the melted material from flowing through the perforation 39 while providing a gas passage from reservoir 37 to head portion 38. Located throughout the length of hollow passageway 36 is a wick 43 which extends into reservoir 37. A scale 44 is provided adjacent to passageway 36.

The circular form of the stem and the wick is preferable since it has the desirable advantage of reducing the sensitivity of the indicating device in any upright position by minimizng the hydrostatic pressure for any given length of wick through which the fusible material migrates. The circular stem also avoids sharp bends or kinks that cause non-uniform compression of the wick resulting in undesirable irregularities in the interstices.

The aforedescribed indicating devices can be used singly or in a series. A plurality of the devices each having a circular stem of increasing circumference, can be arranged concentrically on a single backing, such as a small card, to permit separate indications of the exceeding of different temperatures. A plurality of the devices having straight stems can also be attached to a backing such as cardboard or wood.

These indicating devices can be used in any instance in which it is necessary to ascertain the exposure of heat-sensitive materials or equipment to temperatures in excess of a desired level, and/or the duration of such exposure. They find particular advantage where accurate and reliable measurements of the time of exposure to temperatures exceeding a desired level are required. Such devices can advantageously be used to monitor the storage temperature of items such as food, photographic materials and drugs, all of which will deteriorate when subjected to temperatures exceeding a specific level for a certain length of time. Since such items usually will not be deleteriously effected by brief periods of temperatures slightly above a critical level, an accurate and precise indicating device such as described herein which can sum or integrate the periods of temperature overexposure is essential to determine if internal damage of the items has taken place.

Although this invention has been described with reference to illustrative embodiments thereof, it will be apparent to those skilled in the art that the principles of this invention can be embodied in other forms but within the scope of the claims.

I claim:
1. A fluid-tight indicator device comprising a reservoir containing a material fusible at a predetermined temperature, an inflexible, tubular member connected at each end to said reservoir to ensure gas flow communication between said tubular member and the interior of said reservoir, a wick of predetermined porosity confined within said tubular member such that the peripheral surface of said wick is in contact with the interior surface of said tubular member and such that only one end of said wick is in contact with the fusible material when the temperature of said material is equal to and greater than said predetermined temperature, and a scale located adjacent to said wick to indicate the degree of migration of said fusible material through said wick, said scale being calibrated to indicate the elapsed time during which said migration occurred.

2. The device of claim 1 in which said tubular member is substantially circular.

3. A fluid-tight indicator device comprising a base portion having a reservoir and a gas space, a hollow substantially circular stem attached to said base portion and open to said reservoir at one end, the end of said stem distal to said reservoir attached to said base portion and communicating with said gas space, a fusible material contained within said reservoir, a wick contained within said stem and contacting said fusible material at said one end when said fusible material is fused, said fusible material being capable of migrating through said wick by capillary action and being visible through at least a portion of said stem throughout substantially its entire length, a time scale located adjacent to said wick to indicate the degree of migration of said fusible material through said wick, said scale being calibrated to indicate the elapsed time during which such migration occurred, and means within said base portion for separating said gas space and said reservoir, said means having a passage impermeable to said fusible material and extending from said gas space to said reservoir.

4. The device of claim 3 in which said means comprises a perforate plug which is not wettable by said fusible material.

5. The device of claim 4 in which said plug is made of polytetrafluoroethylene.

6. The device of claim 3 in which the fusible material is a microcrystalline wax.

7. The device of claim 3 in which the wick is comprised of strands of fiber which are wetted by the fusible material.

8. The device of claim 7 in which the strands are twisted.

9. The device of claim 8 in which the strands are selected from the group consisting of natural and synethetic fibers.

10. The device of claim 9 in which the fibers are monofilaments.

11. The device of claim 10 in which the fibers are nylon.

12. The device of claim 3 in which the stem is a plastic capable of withstanding large compression forces.

13. The device of claim 12 in which the plastic is a synthetic resin.

14. The device of claim 13 in which the synthetic resin is selected from the group consisting of polypropylene and polytetrafluoroethylene.

15. The device of claim 1 in which said tubular member is substantially straight.

16. The device of claim 15 in which one end of said tubular member communicates with said reservoir through a top portion and a second substantialy straight tubular member.

17. A fluid-tight indicator device comprising two sheets of hard transparent material secured together in a fluid-tight relationship, said sheets having mating grooves forming a reservoir and a curved passageway entering said reservoir at one end and being in gas flow communication with said reservoir at said other end, a fusible material contained within said reservoir, a wick contained within said hollow passageway and contacting said fusible material at said one end when said fusible material is fused, said fusible material being capable of migrating through said wick, and a scale located adjacent to said wick.

18. The device of claim 17 in which said other end of said passageway communicates with said reservoir through a perforation, impermeable to said fusible material.

19. The device of claim 17 in which the sheets are made of a transparent synthetic resin.

20. The device of claim 19 in which said synthetic resin is selected from the group consisting of polypropylene and polytetrafluoroethylene.

21. The device of claim 3 wherein said wick, having a predetermined porosity, is confined within said hollow passageway such that the peripheral surface of said wick is in contact with the internal surface of said hollow passageway.

22. The device of claim 17 wherein said wick, of predetermined porosity, is confined within said hollow passageway such that the peripheral surface of said wick is in contact with the internal surface of said hollow passageway.

References Cited by the Examiner

UNITED STATES PATENTS

| | | |
|---|---|---|
| 2,460,215 | 1/1949 | Chase. |
| 2,560,537 | 7/1951 | Anderson _____ 73—358 X |
| 2,847,067 | 8/1958 | Brewer _____ 73—358 X |
| 2,850,393 | 9/1958 | Romito. |

LOUIS R. PRINCE, *Primary Examiner.*

D. M. YASICH, *Assistant Examiner.*